(12) United States Patent
Zhi (10) Patent No.: US 8,121,603 B2
(45) Date of Patent: Feb. 21, 2012

(54) METHOD FOR MOBILE COMMUNICATION HANDOVER AND SYSTEM AND BASE STATION THEREOF

(75) Inventor: Hui Zhi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 12/394,329

(22) Filed: Feb. 27, 2009

(65) Prior Publication Data

US 2009/0163213 A1    Jun. 25, 2009

Related U.S. Application Data

(63) Continuation of application No. PCT/CN2007/001607, filed on May 17, 2007.

(30) Foreign Application Priority Data

Aug. 31, 2006   (CN) .......................... 2006 1 0111874

(51) Int. Cl.
  *H04W 36/00*   (2009.01)
(52) U.S. Cl. ......... 455/442; 455/436; 455/443; 455/438
(58) Field of Classification Search ........... 455/436–444
  See application file for complete search history.

(56) References Cited

U.S. PATENT DOCUMENTS

| 6,850,770 | B2 | 2/2005 | Hwang | |
|---|---|---|---|---|
| 2002/0173329 | A1 | 11/2002 | Hwang | |
| 2004/0213241 | A1* | 10/2004 | Kukic | 370/395.1 |
| 2006/0039326 | A1 | 2/2006 | Jeong et al. | |
| 2006/0083363 | A1* | 4/2006 | Bonn et al. | 379/88.17 |
| 2006/0176841 | A1 | 8/2006 | Pepper et al. | |
| 2009/0054071 | A1* | 2/2009 | Mustapha | 455/450 |

FOREIGN PATENT DOCUMENTS

| CN | 1702981 A | 11/2005 |
|---|---|---|
| CN | 1819696 | 8/2006 |
| KR | 10-2006-0081261 | 7/2006 |

(Continued)

OTHER PUBLICATIONS

3GPP TS 25.433 V7.1.0 (Jun. 2006) Technical Specification 3rd Generation Partnership Project; Technical Specification Group Radio Access Network; UTRAN Iub interface Node B Application Part (NBAP) signaling (Release 7).*

(Continued)

*Primary Examiner* — Kent Chang
*Assistant Examiner* — Ronald Eisner
(74) *Attorney, Agent, or Firm* — Staas & Halsey LLP (57) ABSTRACT

A method for mobile communication handover and a system and a base station thereof are disclosed in the embodiments of present invention, wherein the method includes steps: on the basis of first link which only bears DCH service and has already existed, adding a second link bearing DCH and E-DCH services and a third link bearing any service; making softer combining for the DCH service of the first link and the second link; in the case of failing to add the third link, informing radio network controller by carrying the DCH softer combining information and E-DCH service addition information which are not in a same diversity indication choice field in link addition failure message. The embodiment of present invention could enhance the successful ratio of communication handover, and maintain communication continuously.

15 Claims, 6 Drawing Sheets

FOREIGN PATENT DOCUMENTS

| WO | 02093797 A2 | 11/2002 |
| WO | 2006/016786 | 2/2006 |
| WO | 2006016786 A1 | 2/2006 |
| WO | 2008/040195 | 4/2008 |

OTHER PUBLICATIONS

*3rd Generation Partnership Project; Technical Specification Group Radio Access Network; UTRAN Iub interface Node B Application Part (NBAP) signaling (Release 6)*, 3GPP TS 25.433 v6.11.0 (Sep. 2006), pp. 1-762.

English language translation of the Written Opinion, mailed Aug. 30, 2007, in corresponding International Application PCT/CN2007/001607.

Office Action, mailed Apr. 24, 2009, in corresponding Chinese Application 200610127962.9.

*Corrections to E-DCH Uplink Combination in RL Setup and RL Addition*, Huawei, 3GPP TSG RAN WG3 Meeting #52, Shanghai, China, May 8-12, 2006, pp. 1-31.

*Correction of Combined Active Set Update and E-DCH Serving Cell Change with Radio Link Addition Request (Inter Node B Case)*, Huawei, 3GPP TSG RAN WG3 Meeting #53, Tallinn, Estonia, Aug. 28-Sep. 1, 2006 (6 pp.).

European Search Report, mailed Oct. 5, 2010, in corresponding European Application No. 07785483.4 (3 pp.).

ETSI TS 125 433 V7.1.0. Universal Mobile Telecommunications System (UMTS); UTRAN Iub interface Node B Application Part (NBAP) signalling (3GPP TS 25.433 version 7.1.0 Release 7). Jun. 2006, chapters 8-9.

Rejection Decision, mailed Jan. 26, 2011, in corresponding Chinese Application No. 200610127962.9 (17 pp.)

*3rd Generation Partnership Project; Technical Specification Group Radio Access Network; UTRAN Iub interface Node B Application Part (NBAP) signaling (Release 7)*, 3GPP TS 25.433 V7.1.0, Mar. 2006, pp. 1-805.

Communication Pursuant to Article 94(3) EPC, mailed Sep. 2, 2011, in European Application No. 07785483.4 (6 pp.).

* cited by examiner

METHOD FOR MOBILE COMMUNICATION HANDOVER AND SYSTEM AND BASE STATION THEREOF

This is a continuation of international application No. PCT/CN2007/001607, filed on May 17, 2007, which claims the priority of Chinese patent application No. 200610111874.X submitted to the Chinese Patent Office on Aug. 31, 2006 and titled "METHOD FOR MOBILE COMMUNICATION HANDOVER AND SYSTEM AND BASE STATION THEREOF". The entire contents of the two applications are incorporated herein by reference.

FIELD OF THE INVENTION

The present invention relates to communication methods and systems and base stations thereof, and in particular, to a method for mobile communication handover and a system and a base station thereof.

BACKGROUND OF THE INVENTION

Figure 1:
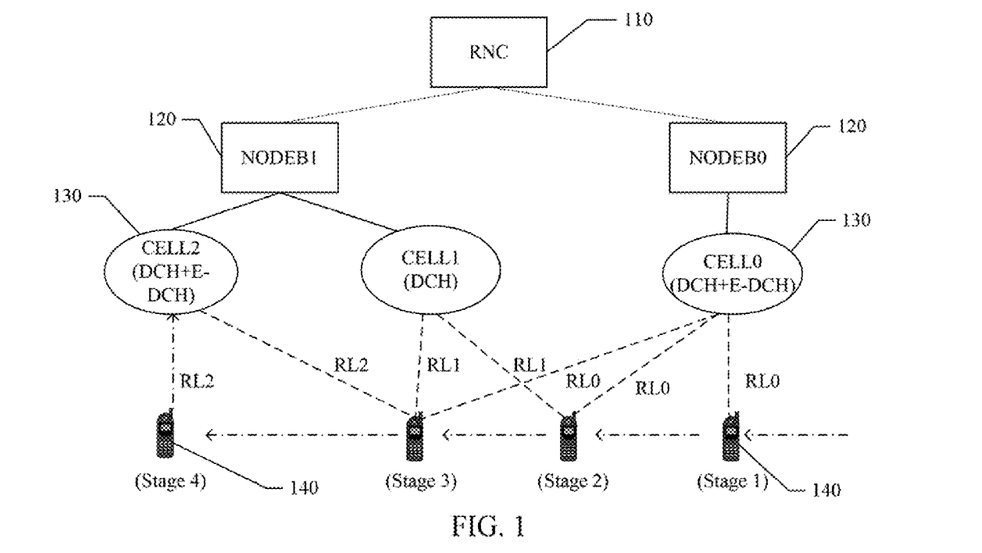
FIG. 1 is a schematic diagram illustrating a scenario of mobile communication handover in the prior art.

Referring to FIG. 1, a radio network involved in cell handover in the prior art includes a Radio Network Controller (RNC) 110, nodes (NODEB, i.e. base stations of a WCDMA system) 120 and User Equipments (UEs) 140 attached to the nodes 120. When a UE 140 is handed over between cells 130, relevant information is added by a node 120 in a RADIO LINK ADDITION (RL ADDITION) signaling process to inform the RNC 110.

Figure 2:
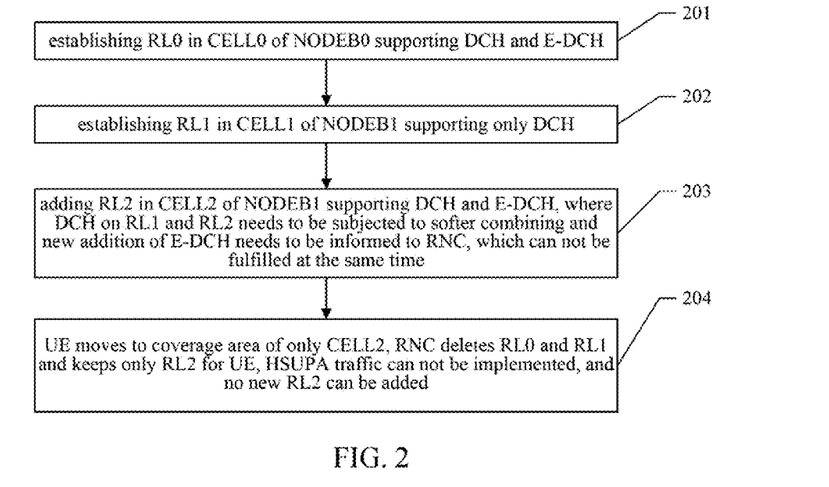
FIG. 2 is a flow chart of mobile communication handover in the scenario illustrated in FIG. 1.

Referring to FIGS. 1 and 2, an example of handover in the prior art, i.e. a process of switching Dedicated CHannel/Enhanced UpLink (UL) Dedicated CHannel (DCH/E-DCH) traffic between cells 130 includes the following steps.

201: At stage 1, the UE 140 establishes Radio Link (RL) 0 in CELL0 (CELL is a logic cell in the case of a WCDMA system) of NODEB0 through a signaling process for radio link establishment. CELL0 supports both DCH and E-DCH traffic. The specific traffic borne on RL0 is 3.4K+64K (downlink only)+High Speed Uplink Packet Access (HSUPA), in which the DCH traffic refers to 3.4K+64K (downlink only), and the E-DCH traffic refers to HSUPA.

202: At stage 2, the UE 140 moves to the common coverage area to CELL0 of NODEB0 and CELL1 of NODEB1 and establishes RL1 in CELL1 of NODEB1 through a signaling process for radio link establishment. CELL1 supports only DCH traffic. In this case, the specific traffic borne on RL1 is DCH: 3.4K+64K (downlink only). At this point, the UE 140 has two radio links RL0 and RL1, on which DCH data are subjected to soft combining at NODEB1. The soft combining here means that a radio link is selected at the side of the RNC 110.

203: As the UE 140 continues to move at stage 3, the UE 140 adds RL2 in CELL2 of NODEB1 through a signaling process for radio link establishment. CELL2 supports DCH and E-DCH traffic. The process for the addition includes the following.

a: CELL2 and the UE 140 detect signals for themselves respectively.

b: CELL2 and the UE 140 report the respective detection results to the RNC 110 via NODEB1.

c: The RNC 110 sends to NODEB1 a request for adding RL2.

d: NODEB1 adds RL2 and informs the RNC 110 of the link establishment result via an RL ADDITION signaling process, and the RNC 110 performs communication control according to the link establishment result.

204: As the UE 140 continues to move at stage 4, the signals for the UE 140 in CELL0 and CELL1 become so weak that the RNC 110 may delete RL0 and RL1 and only one radio link RL2 remains for the UE 140.

In the above step 203, because CELL2 supports DCH and E-DCH traffic and CELL0 also supports E-DCH traffic, the RNC 110 may request NODEB1 for bearer of E-DCH traffic on the newly added RL2, thereby enabling continuation of the traffic. Therefore, the specific traffic borne on RL2 is 3.4K+64K (downlink only)+HSUPA. At this point, the UE 140 has three radio links RL0, RL1 and RL2. RL0 is subjected to DCH soft combining with RL1 and RL2 respectively. RL1 and RL2 are subjected to DCH softer combining. The softer combining here means that the radio links are combined at the side of a NODEB into one link for sending the data to the RNC 110.

In general, only the softer combining of the links and the new establishment/new addition of DCH/E-DCH need to be informed to the RNC 110 via an RL ADDITION signaling process. The RNC 110 directly handles the soft combining in which a link is selected between the two NODEBs. The softer combining in which the links are combined at one NODEB needs to be presented in RL ADDITION signal by the NODEB. Likewise, the new establishment/new addition of DCH/E-DCH which is also implemented at one NODEB, needs to be presented in RL ADDITION signal by the NODEB.

Referring to Table 1, in sub-step d of step 203, information of the new establishment of E-DCH traffic and information of the softer combining of DCH traffic are informed to the RNC 110 in a RADIO LINK ADDITION RESPONSE message sent from NODEB1 to the RNC 110.

TABLE 1

Schematic structure of RADIO LINK ADDITION RESPONSE message

| IE/Group Name | Presence | Range | IE Type and Reference | Semantics Description | Criticality | Assigned Criticality |
|---|---|---|---|---|---|---|
| . . . | . . . | . . . | . . . | . . . | . . . | . . . |
| RL Information Response | | 1 . . . <maxnoofRLs-1> | | | EACH | ignore |
| >RL ID | M | | 9.2.1.53 | | — | |
| >RL Set ID | M | | 9.2.2.39 | | — | |
| >Received Total Wide Band Power | M | | 9.2.2.39A | | — | |
| >CHOICE Diversity Indication | M | | | | — | |
| >>Combining | | | | | — | |
| >>>RL ID | M | | 9.2.1.53 | Reference RL | — | |
| >>Non Combining | | | | | — | |

TABLE 1-continued

Schematic structure of RADIO LINK ADDITION RESPONSE message

| IE/Group Name | Presence | Range | IE Type and Reference | Semantics Description | Criticality | Assigned Criticality |
|---|---|---|---|---|---|---|
| >>>DCH Information Response | M | | 9.2.1.20C | | — | |
| >>>E-DCH FDD Information Response | O | | 9.2.2.13Db | | YES | ignore |
| >SSDT Support Indicator | M | | 9.2.2.46 | | — | |
| ... | ... | ... | ... | ... | ... | ... |
| E-DCH Serving Cell Change Information Response | O | | 9.2.2.18Ed | | YES | Ignore |

1. For the new establishment of E-DCH traffic, Non Combining corresponding to E-DCH Frequency Division Duplex (FDD) Information Response information needs to be selected in a CHOICE Diversity Indication field of the RADIO LINK ADDITION RESPONSE message sent from the NODEB1 to the RNC 110, so that the RNC 110 understands that a link on which E-DCH traffic runs needs to be established for the UE 140.

2. For the softer combining of DCH traffic, Combining corresponding to an RL Identifier (ID) needs to be selected in the CHOICE Diversity Indication field, so that the RNC 110 understands that softer combining of the DCH needs to be implemented for the UE 140.

In Information Element (IE) column in the above Table 1, the symbol ">" represents a first level field, the symbol ">>" following the symbol ">" represents a second level field subordinate to the first level field, and the symbol ">>>" represents a third level field corresponding to the second level field. For the CHOICE Diversity Indication field, two second level fields, Combining and Non Combining, are provided, to which third level fields, RL ID and DCH Information Response, are subordinate respectively. The Combining field is used to inform the RNC of the softer combining, and the Non Combining field is used to inform the RNC of the new establishment/new addition of DCH/E-DCH.

For a RADIO LINK ADDITION RESPONSE message, only one second level field, i.e. Combining or Non Combining, can be selected in the CHOICE Diversity Indication field. In other words, only one entry, Combining or Non Combining, can be selected in the CHOICE Diversity Indication field, in the case of which the CHOICE Diversity Indication field would be erroneous no matter how the CHOICE Diversity Indication field is filled.

Because in step 204, as the UE 140 continues to move at stage 4, the signals of the UE 140 in CELL0 and CELL1 become so weak that the RNC 110 may delete RL0 and RL1 and only one radio link RL2 remains for the UE 140.

In this case, if Combining is selected in the CHOICE Diversity Indication field in step 203, the E-DCH FDD Information Response information can not be informed to the RNC because only one entry can be selected in the CHOICE Diversity Indication field. At stage 4, the HSUPA traffic corresponding to E-DCH for the UE 140 is therefore interrupted. If Non Combining is selected in the CHOICE Diversity Indication field in step 203, the NODEB1 can not fill the DCH Information Response IE, resulting in failure of NODEB1 to add RL2. At stage 4, therefore, no radio link is available for the UE 140 and the entire traffic for the UE 140 is interrupted.

Figure 3:
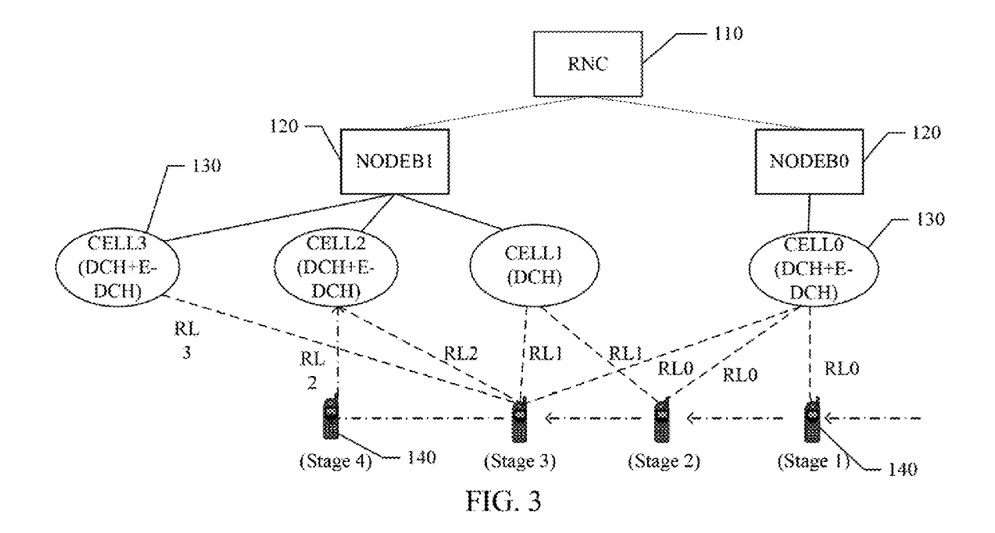
FIG. 3 is a schematic diagram illustrating another scenario of mobile communication handover in the prior art.
Figure 4:
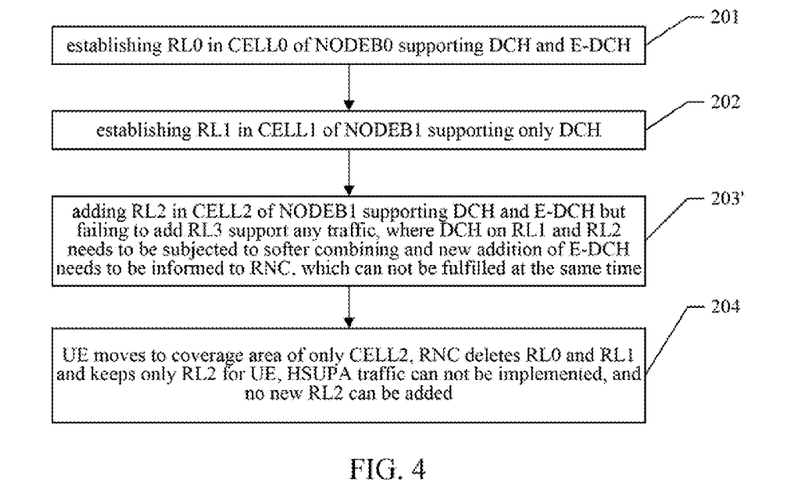
FIG. 4 is a flow chart of mobile communication handover in the scenario illustrated in FIG. 3.

In another case, the above step 203 may be 203', referring to FIGS. 3 and 4.

203': As the UE 140 continues to move at stage 3, the UE 140 adds RL2 in CELL2 of NODEB1 successfully through a signaling process for radio link establishment and tries to add RL3 in CELL3 of NODEB1 through a signaling process for radio link establishment but fails. CELL2 supports DCH and E-DCH traffic, and CELL3 may be a cell that supports any traffic, for example, only DCH or E-DCH traffic, or possibly both DCH and E-DCH traffic. The process for the successful addition of RL2 and failed addition of RL3 includes the following.

a: CELL2, CELL3 and the UE 140 detect signals for themselves respectively.

b: CELL2, CELL3 and the UE 140 report the respective detection results to the RNC 110 via NODEB1.

c: The RNC 110 sends to NODEB1 a request for adding RL2 and RL3.

d: NODEB1 adds RL2 successfully but fails to add RL3 and informs the RNC 110 of the link establishment result via a RADIO LINK ADDITION FAILURE message as shown in Table 2, instead of the RADIO LINK ADDITION RESPONSE message as shown in Table 1. The RNC 110 performs communication control according to the link establishment result.

TABLE 2

Schematic structure of RADIO LINK ADDITION FAILURE message

| IE/Group Name | Presence | Range | IE Type and Reference | Semantics Description | Criticality | Assigned Criticality |
|---|---|---|---|---|---|---|
| ... | ... | ... | ... | ... | ... | ... |
| CHOICE Cause Level | M | | | | YES | ignore |
| >General | | | | | — | |
| >>Cause | M | | 9.2.1.6 | | — | |
| >RL Specific | | | | | — | |
| >>Unsuccessful RL Information Response | | 1...<maxnoofRLs-1> | | | EACH | ignore |

TABLE 2-continued

Schematic structure of RADIO LINK ADDITION FAILURE message

| IE/Group Name | Presence | Range | IE Type and Reference | Semantics Description | Criticality | Assigned Criticality |
|---|---|---|---|---|---|---|
| >>>RL ID | M | | 9.2.1.53 | | — | |
| >>>Cause | M | | 9.2.1.6 | | — | |
| >>Successful RL Information Response | | 0...<maxnoofRLs-2> | | | EACH | ignore |
| >>>RL ID | M | | 9.2.1.53 | | — | |
| >>>RL Set ID | M | | 9.2.2.39 | | — | |
| >>> Received Total Wide Band Power | M | | 9.2.2.39A | | — | |
| >>>CHOICE Diversity Indication | M | | | | — | |
| >>>>Combining | | | | | — | |
| >>>>>RL ID | M | | 9.2.1.53 | Reference RL | — | |
| >>>>Non Combining | | | | | — | |
| >>>>>DCH Information Response | M | | 9.2.1.20C | | — | |
| >>>>>E-DCH FDD Information Response | O | | 9.2.2.13Db | | YES | ignore |
| >>>SSDT Support Indicator | M | | 9.2.2.46 | | — | |
| ... | ... | ... | ... | ... | ... | ... |

In Table 2, for the Successful RL Information Response field, a CHOICE Diversity Indication field is provided subordinate thereto, which is identical to that in Table 1 but becomes a third level field, and to which two fourth level fields, Combining and Non Combining, are subordinate. For the two fourth level fields, fifth level fields, RL ID and DCH Information Response and E-DCH FDD Information Response are provided subordinate thereto respectively. The Combining field is used to inform the RNC of the softer combining, and the Non Combining field is used to inform the RNC of the new establishment/new addition of DCH/E-DCH.

Likewise, for a RADIO LINK ADDITION FAILURE message, only one fourth level field, i.e. Combining or Non Combining, can be selected in the CHOICE Diversity Indication field. In other words, only one entry, Combining, or Non Combining, can be selected in the CHOICE Diversity Indication field, in the case of which the CHOICE Diversity Indication field would be erroneous no matter how the CHOICE Diversity Indication field is filled. This is for the same reasons as stated with respect to the RADIO LINK ADDITION RESPONSE message.

The process of switching DCH/E-DCH traffic between cells for a UE in the prior art is not limited to the above scenarios. The above problems may occur when softer combining needs to be implemented and establishment of relevant traffic needs to be reported to an RNC. In other words, a NODEB can not inform the RNC correctly of information of a link for a current user due to the deficiency in the structure of the RADIO LINK ADDITION FAILURE message, resulting in an error in signaling processing at the IUB interface (an interface between the RNC and the Node B).

SUMMARY OF THE INVENTION

Embodiments of the present invention provide a method for mobile communication handover, a system for mobile communication handover and a base station, thereby improving success ratio of mobile communication handover.

The embodiments of the present invention provide the following solutions.

A method for mobile communication handover includes the following steps:

in addition to a first link for bearing only DCH traffic, adding a second link for bearing DCH and E-DCH traffic and a third link for bearing any traffic;

in the case of failure to add the third link, implementing softer combining of DCH traffic on the first and second links; and informing a radio network controller of both information of the softer combining of DCH traffic and information of the addition of E-DCH traffic, according to which the radio network controller performs communication control.

A mobile communication system includes a first base station and a radio network controller, wherein the first base station has a first link subordinate thereto for bearing only DCH traffic, and is adapted to add a second link for bearing DCH and E-DCH traffic and a third link for bearing any traffic, implement softer combining of DCH traffic on the first and second links in the case of failure to add the third link, and inform the radio network controller of both information of the softer combining of DCH traffic and information of the addition of E-DCH traffic; and the radio network controller is adapted to perform communication control according to the received information.

A mobile communication base station includes:

a link management unit under the control of a radio network controller, adapted to manage a first link for bearing only DCH traffic and add a second link for bearing DCH and E-DCH traffic and a third link for bearing any traffic;

a softer combining unit, adapted to implement softer combining of DCH traffic on the first and second links in the case of failure to add the third link; and a handover information generation unit, adapted to inform the radio network controller of both information of the softer combining of DCH traffic and information of the addition of E-DCH traffic.

According to the embodiments of the present invention, both the information of the softer combining of DCH traffic and the information of the addition of E-DCH traffic are informed to the radio network controller, avoiding a communication fault due to the fact that only one of the information of the softer combining and the information of the addition of E-DCH traffic can be selected because only one fourth level field can be selected in the third level field CHOICE Diversity Indication in the prior art, and thereby improving success ratio of mobile handover of a UE between cells of different nodes and ensuring normal and stable communication.

DETAILED DESCRIPTION OF THE EMBODIMENTS

The embodiments of the present invention are described in detail with reference to examples and the accompanying drawings.

The examples are given to illustrate how to implement the embodiments of the present invention when softer combining needs to be implemented and establishment of relevant traffic needs to be reported to an RNC. These examples relate to scenarios of mobile communication handover of a UE between two NODEBs, in which the cell of the first NODEB supports DCH and E-DCH (hereinafter referred to as DCH/E-DCH) traffic, and the second NODEB has two or three cells in which one supports DCH/E-DCH traffic and the other one/two support only DCH traffic. The UE moves from the cell of the first NODEB to the cell of the second NODEB supporting only DCH traffic, and then to the cell of the second NODEB supporting DCH/E-DCH traffic.

Figure 5:
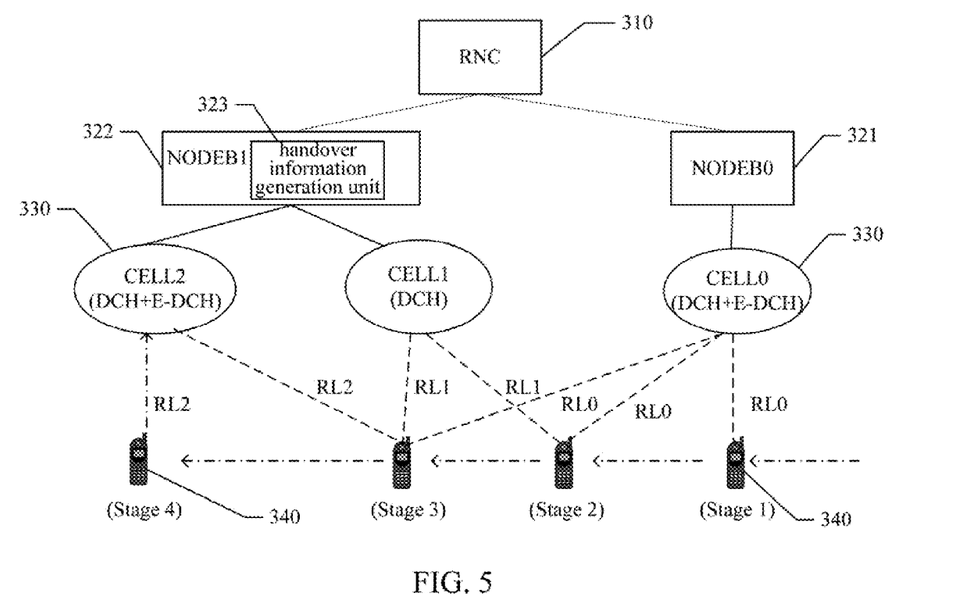
FIG. 5 is a schematic diagram illustrating an embodiment of the mobile communication system according to the present invention.
Figure 6:
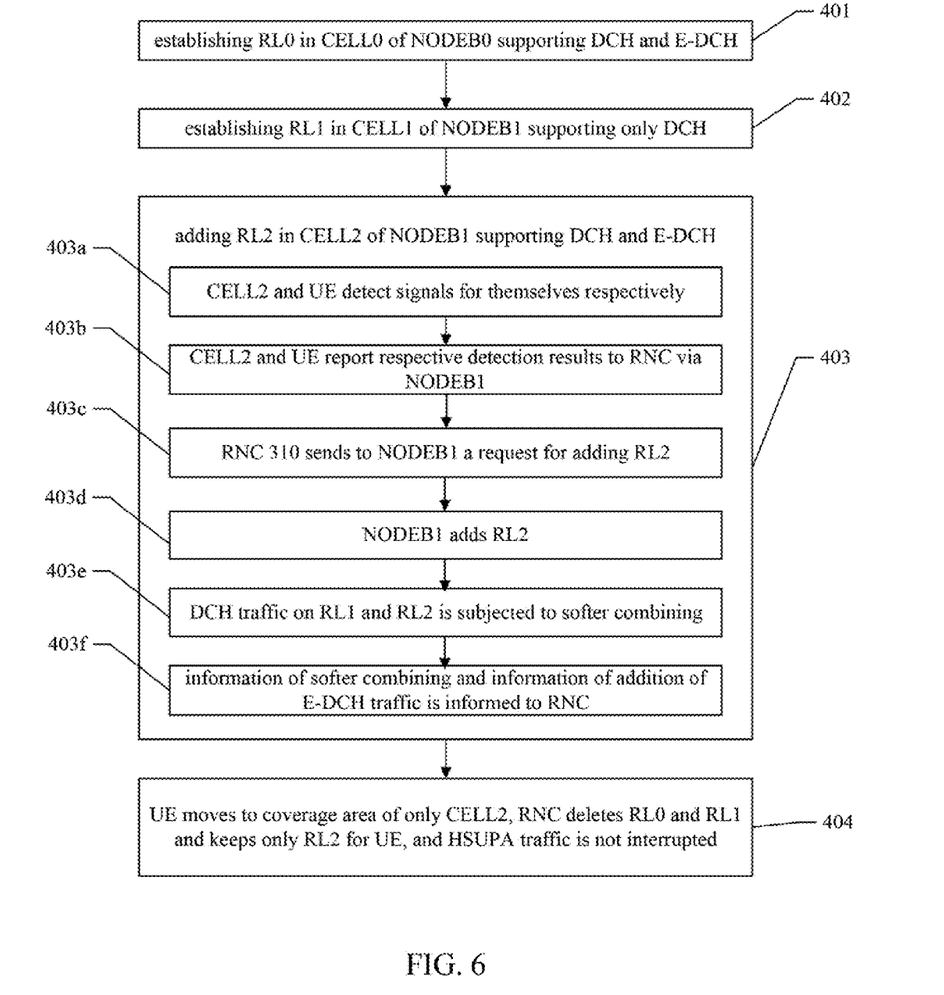
FIG. 6 is a flow chart illustrating an embodiment of the method for mobile communication handover according to the present invention.

Referring to FIG. 5, a process of switching DCH/E-DCH traffic between cells 330 for a UE 340 is illustrated with reference to an embodiment of the method for mobile communication handover according to the present invention. The mobile communication handover of the UE 340 is implemented between NODEB 321 and NODEB 322 which are both under the control of an RNC 310. The NODEB 321 has CELL0 and the NODEB 322 has CELL1 and CELL2. Referring to FIGS. 5 and 6, the process includes the following steps.

401: At stage 1, the UE 340 establishes RL0 in CELL0 of the NODEB 321 through a signaling process for radio link establishment. CELL0 supports DCH and E-DCH traffic. The specific traffic borne on RL0 is 3.4K+64K (downlink only)+HSUPA, in which the DCH traffic refers to 3.4K+64K (downlink only), and the E-DCH traffic refers to HSUPA.

402: At stage 2, the UE 340 moves to the common coverage area to CELL0 of the NODEB 321 and CELL1 of the NODEB 322 and establishes RL1 in CELL1 of the NODEB 322 through a signaling process for radio link establishment. CELL1 supports only DCH traffic. In this case, the specific traffic borne on RL1 is DCH: 3.4K+64K (downlink only). At this point, the UE 340 has two radio links RL0 and RL1, on which DCH data are subjected to soft combining at the NODEB 322.

403: As the UE 340 continues to move at stage 3, the UE 340 adds RL2 in CELL2 of the NODEB 322 through a signaling process for radio link establishment. CELL2 supports DCH and E-DCH traffic. The process for the addition includes the following.

403a: CELL2 and the UE 340 detect signals for themselves respectively.

403b: CELL2 and the UE 340 report the respective detection results to the RNC 310 via the NODEB 322.

403c: The RNC 110 sends to the NODEB 322 a request for adding RL2.

403d: The NODEB 322 adds RL2.

403e: DCH traffic on RL1 and RL2 is subjected to softer combining.

403f: The link establishment result is informed to the RNC 310 by carrying information of the softer combining of DCH traffic and information of the addition of E-DCH traffic in different first level fields respectively of a RADIO LINK ADDITION RESPONSE message, and the RNC 310 performs communication control according to the link establishment result.

404: As the UE 340 continues to move at stage 4, the signals for the UE 340 in CELL0 and CELL1 become so weak that the RNC 310 deletes RL0 and RL1 and keeps RL2 successfully so that the HSUPA traffic is not interrupted.

In 403, because CELL2 supports DCH and E-DCH traffic and CELL0 also supports E-DCH traffic, the RNC 310 requests the NODEB 322 for bearer of E-DCH traffic on the newly added RL2, thereby enabling continuation of the traffic. Therefore, the specific traffic borne on RL2 is 3.4K+64K (downlink only)+HSUPA. At this point, the UE 340 has three radio links RL0, RL1 and RL2. RL0 is subjected to DCH soft combining with RL1 and RL2. RL1 and RL2 are subjected to DCH softer combining.

In this case, the softer combining of the links and the new establishment/new addition of DCH/E-DCH need to be informed to the RNC 310 via an RL ADDITION signaling process.

Referring to Table 3, in 403f, the information of the new establishment of E-DCH traffic and the information of the softer combining of DCH traffic are informed to the RNC 310 in a RADIO LINK ADDITION RESPONSE message sent from the NODEB 322 to the RNC 310.

TABLE 3

Schematic structure of modified RADIO LINK ADDITION RESPONSE message

| IE/Group Name | Presence | Range | IE Type and Reference | Semantics Description | Criticality | Assigned Criticality |
|---|---|---|---|---|---|---|
| . . . | . . . | . . . | . . . | . . . | . . . | . . . |
| >Received Total Wide Band Power | M | | 9.2.2.39A | | — | |

TABLE 3-continued

Schematic structure of modified RADIO LINK ADDITION RESPONSE message

| IE/Group Name | Presence | Range | IE Type and Reference | Semantics Description | Criticality | Assigned Criticality |
|---|---|---|---|---|---|---|
| >CHOICE Diversity Indication | M | | | | — | |
| >>Combining | | | | | — | |
| >>>RL ID | M | | 9.2.1.53 | Reference RL | — | |
| >>Non Combining | | | | | — | |
| >>>DCH Information Response | M | | 9.2.1.20C | | — | |
| >SSDT Support Indicator | M | | 9.2.2.46 | | — | |
| >DL Power Balancing Activation Indicator | O | | 9.2.2.12C | | YES | ignore |
| >E-DCH RL Set ID | O | | RL Set ID 9.2.2.39 | | YES | ignore |
| >E-DCH FDD DL Control Channel Information | O | | 9.2.2.13Dc | | YES | ignore |
| >Initial DL DPCH Timing Adjustment | O | | DL DPCH Timing Adjustment 9.2.2.10A | | YES | ignore |
| >E-DCH FDD Information Response | O | | 9.2.2.13Db | | YES | ignore |
| Criticality Diagnostics | O | | 9.2.1.17 | | YES | ignore |
| HS-DSCH Serving Cell Change Information Response | O | | 9.2.2.18Ec | | YES | Ignore |
| E-DCH Serving Cell Change Information Response | O | | 9.2.2.18Ed | | YES | Ignore |

In the IE column in Table 3, the symbol ">" represents a first level field, the symbol ">>" following the symbol ">" represents a second level field subordinate to the first level field, and the symbol ">>>" represents a third level field corresponding to the second level field.

For the first level field CHOICE Diversity Indication, two second level fields, Combining and Non Combining, are provided, to which third level fields, RL ID and DCH Information Response, are subordinate respectively. The Combining field is used to inform the RNC of softer combining, and the Non Combining field is used to inform the RNC of new establishment/new addition of DCH.

The first level field E-DCH FDD Information Response is used to inform the RNC of new establishment/new addition of E-DCH. In this embodiment, this field is used to inform the RNC 310 that a link on which E-DCH traffic runs needs to be established for the UE 340. In other words, the field E-DCH FDD Information Response that is originally subordinate to the field Non Combining of the field CHOICE Diversity Indication is changed to be in parallel to the field CHOICE Diversity Indication. Therefore, combining/non-combining of DCH on RLs and new establishment/new addition of E-DCH are independent of each other. Combining of DCH is indicated by the IE CHOICE Diversity Indication.

In other words, two different first level fields, i.e. the first level field CHOICE Diversity Indication and the first level field E-DCH FDD Information Response are generated in a same RADIO LINK ADDITION RESPONSE message according to the embodiment of the present invention. Therefore, both the information of the softer combining and the information of the establishment of E-DCH traffic can be informed to the RNC 310, avoiding a communication fault due to the fact that only one of the information of the softer combining and the information of the establishment of E-DCH traffic can be selected because only one second level field can be selected in the first level field CHOICE Diversity Indication in the prior art no matter how the CHOICE Diversity Indication field is filled. The communication fault is described as follows.

In 404, as the UE 340 continues to move at stage 4, the signals for the UE 340 in CELL0 and CELL1 become so weak that the RNC 310 may delete RL0 and RL1 and only one radio link RL2 remains for the UE 340. In this case, according the prior art method, if Combining is selected in the CHOICE Diversity Indication field, the E-DCH FDD Information Response information can not be informed to the RNC because only one entry can be selected in the CHOICE Diversity Indication field. At stage 4, the HSUPA traffic corresponding to E-DCH for the UE 340 is therefore interrupted. If Non Combining is selected in the CHOICE Diversity Indication field, the NODEB 322 can not fill the DCH Information Response IE, resulting in failure of the NODEB 322 to add RL2. At stage 4, therefore, no radio link is available for the UE 340 and the entire traffic for the UE 340 is interrupted.

As can be seen, the embodiment of the present invention avoids the communication fault due to the fact that the RNC 310 can not be informed of both the information of the softer combining and the information of the new establishment of E-DCH traffic in the prior art and ensures normal and stable communication in the case of mobile handover of the UE 340 between cells of different NODEBs.

The scenario to which the embodiments of the present invention can be applied is not limited to that described above. The present invention is applicable to any cases in which softer combining needs to be implemented and establishment/addition of relevant traffic needs to be reported to the RNC, to avoid occurrence of the above problem.

The format in which the information of the DCH softer combining and the information of the addition of E-DCH traffic are filled into different first level fields respectively is not limited to that shown in Table 3. Alternatively, Combining in the first level field CHOICE Diversity Indication is used to indicate the information of the addition of E-DCH traffic, and the first level field E-DCH FDD Information Response is used to indicate the information of the DCH softer combining. Moreover, the relative position relationship between the first level fields CHOICE Diversity Indication and E-DCH FDD Information Response may be arranged arbitrarily in the table.

Referring to FIG. 5, an embodiment of the present invention provides a mobile communication system including a UE 340, NODEB 321 and NODEB 322, and an RNC 310. The NODEB 322 includes a handover information generation unit 323. Mobile communication handover for the UE 340 is implemented between the NODEB 321 and NODEB 322 which are both under the control of the RNC 310. The NODEB 321 has CELL0 and the NODEB 322 has CELL1 and CELL2. CELL0 and CELL2 support DCH and E-DCH traffic, and CELL1 supports only DCH traffic.

The NODEB 322 has a first link RL1 bearing only DCH traffic. The UE 340 establishes RL1 with CELL1 of the NODEB 322 when both DCH and E-DCH traffic are implemented in CELL0 of the NODEB 321.

When the RNC 310 requests the NODEB 322 to add a second link RL2 for bearing DCH and E-DCH traffic, the NODEB 322 implements softer combining of DCH traffic on RL1 and RL2. The NODEB 322 informs the RNC 310 of information of the softer combining and information of the new addition of E-DCH traffic through the handover information generation unit 323.

In particular, the handover information generation unit 323 is adapted to generate a CHOICE Diversity Indication field, the content of which is Combining (indicating the information of the DCH softer combining), and an E-DCH FDD Information Response field (indicating the information of the new addition of E-DCH traffic), both of which are first level fields, in a RADIO LINK ADDITION RESPONSE message, and send the RADIO LINK ADDITION RESPONSE message carrying the information of the DCH softer combining and the information of the new addition of E-DCH traffic to the RNC 310.

It is understood that the NODEB 322 may also be referred to as a first base station and the NODEB 321 may also be referred to as a second base station.

For the structure of the RADIO LINK ADDITION RESPONSE message, reference may be made to the above Table 3.

Figure 7:
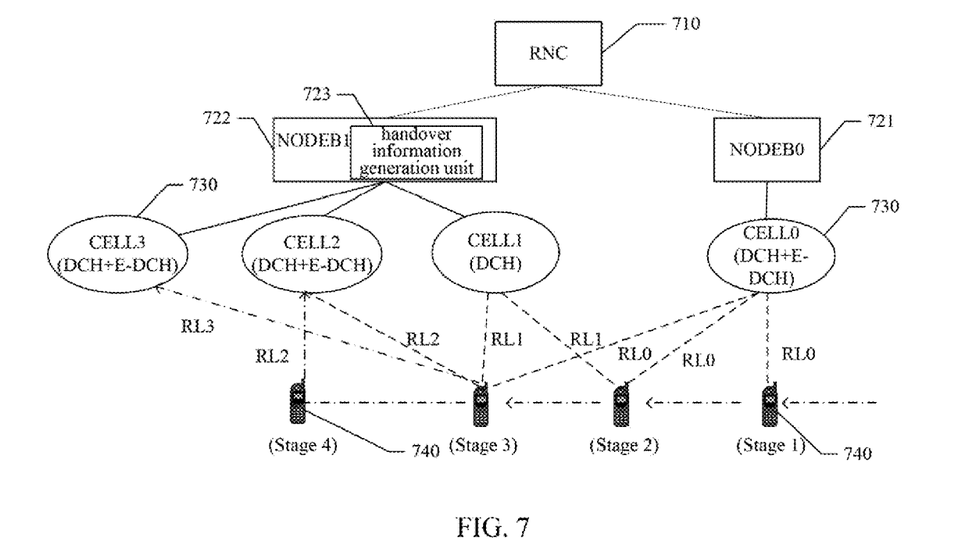
FIG. 7 is a schematic diagram illustrating an embodiment of the mobile communication system according to the present invention.
Figure 8:
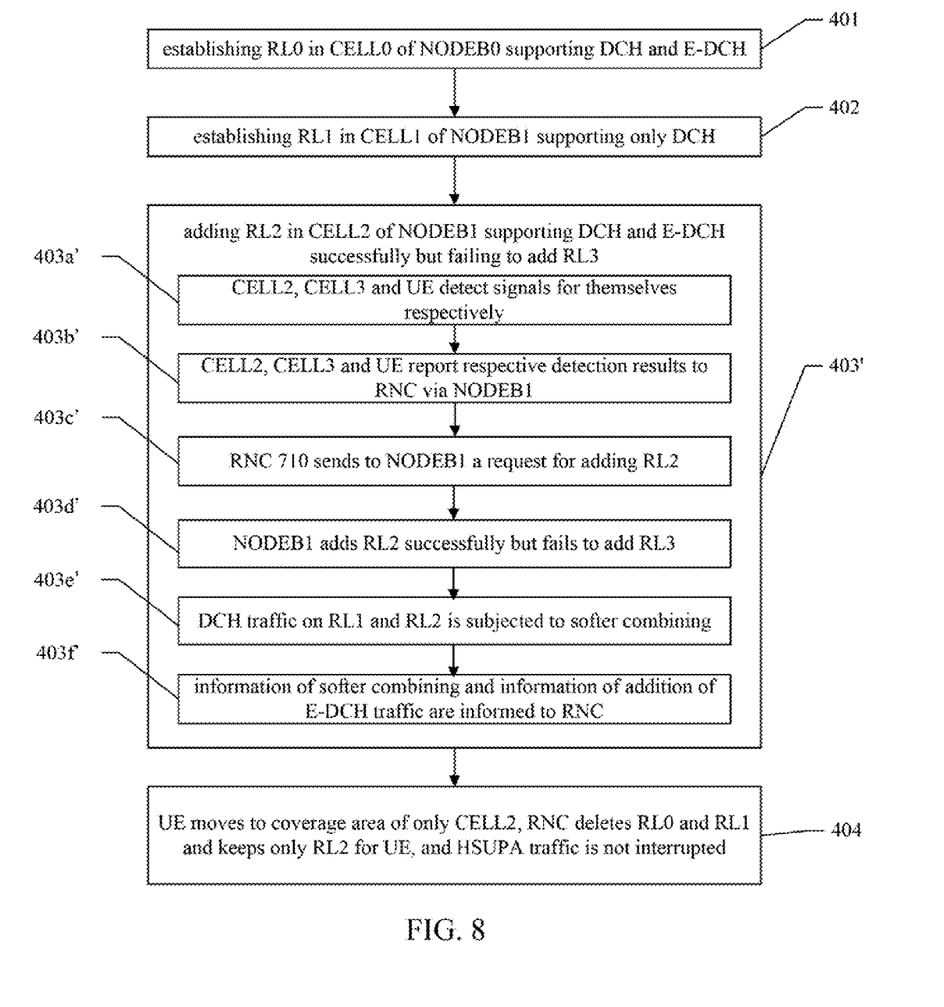
FIG. 8 is a flow chart illustrating an embodiment of the method for mobile communication handover according to the present invention.

Referring to FIG. 7, a process of switching DCH/E-DCH traffic between cells 730 for a UE 740 is illustrated with reference to an embodiment of the method for mobile communication handover according to the present invention. The mobile communication handover of the UE 740 is implemented between two NODEB 721 and NODEB 722 which are both under the control of an RNC 710. The NODEB 721 has CELL0 and the NODEB 722 has CELL1, CELL2 and CELL3. Referring to FIGS. 7 and 8, the process includes the following steps.

401, 402 and 404 are the same as those described with reference to the above embodiment of the method for mobile communication handover according to the present invention and are not described repeatedly herein.

The difference lies in step 403' in the present embodiment that corresponds to step 403 in the first embodiment.

403': As the UE 740 continues to move at stage 3, the UE 740 adds RL2 in CELL2 of NODEB1 successfully through a signaling process for radio link establishment, and tries to add RL3 in CELL3 of NODEB1 through a signaling process for radio link establishment but fails. CELL2 supports DCH and E-DCH traffic, and CELL3 may be a cell that supports any traffic, for example, only DCH or E-DCH traffic, or possibly both DCH and E-DCH traffic. The process for the successful addition of RL2 and failing addition of RL3 includes the following.

403a': CELL2, CELL3 and the UE 740 detect signals for themselves respectively.

403b': CELL2, CELL3 and the UE 740 report the respective detection results to the RNC 710 via the NODEB 722.

403c': The RNC 710 sends to the NODEB 722 a request for adding RL2 and RL3.

403d': The NODEB 722 adds RL2 successfully but fails to add RL3.

403e': DCH traffic on RL1 and RL2 is subjected to softer combining.

403f': The link establishment result is informed to the RNC 710 by not carrying information of the softer combining of DCH traffic and information of the addition of E-DCH traffic in a same CHOICE Diversity Indication field of a modified RADIO LINK ADDITION FAILURE message, and the RNC 710 performs communication control according to the link establishment result. In this embodiment, the information of the softer combining of DCH traffic and the information of the addition of E-DCH traffic are carried in two third level fields subordinate to a second level field Successful RL Information Response.

TABLE 4

Schematic structure 1 of modified RADIO LINK ADDITION FAILURE message

| IE/Group Name | Presence | Range | IE Type and Reference | Semantics Description | Criticality | Assigned Criticality |
|---|---|---|---|---|---|---|
| ... | ... | ... | ... | ... | ... | ... |
| CHOICE Cause Level | M | | | | YES | ignore |
| >General | | | | | — | |
| >>Cause | M | | 9.2.1.6 | | — | |
| >RL Specific | | | | | — | |
| >>Unsuccessful RL Information Response | | 1 ... <maxnoofRLs-1> | | | EACH | ignore |
| >>>RL ID | M | | 9.2.1.53 | | — | |
| >>Cause | M | | 9.2.1.6 | | — | |
| >>Successful RL Information Response | | 0 ... <maxnoofRLs-2> | | | EACH | ignore |
| >>>RL ID | M | | 9.2.1.53 | | — | |
| >>>RL Set ID | M | | 9.2.2.39 | | — | |
| >>> Received Total Wide Band Power | M | | 9.2.2.39A | | — | |

TABLE 4-continued

Schematic structure 1 of modified RADIO LINK ADDITION FAILURE message

| IE/Group Name | Presence | Range | IE Type and Reference | Semantics Description | Criticality | Assigned Criticality |
|---|---|---|---|---|---|---|
| >>>CHOICE Diversity Indication | M | | | | — | |
| >>>>Combining | | | | | — | |
| >>>>>RL ID | M | | 9.2.1.53 | Reference RL | — | |
| >>>>Non Combining | | | | | — | |
| >>>>>DCH Information Response | M | | 9.2.1.20C | | — | |
| >>>SSDT Support Indicator | M | | 9.2.2.46 | | — | |
| >>>DL Power Balancing Activation Indicator | O | | 9.2.2.12C | | YES | ignore |
| >>>E-DCH RL Set ID | O | | RL Set ID 9.2.2.39 | | YES | ignore |
| >>>E-DCH FDD DL Control Channel Information | O | | 9.2.2.13Dc | | YES | ignore |
| >>>Initial DL DPCH Timing Adjustment | O | | DL DPCH Timing Adjustment 9.2.2.10A | | YES | ignore |
| >>>E-DCH FDD Information Response | O | | 9.2.2.13Db | | YES | ignore |
| . . . | . . . | . . . | . . . | . . . | . . . | . . . |

In Table 4, for the third level field CHOICE Diversity Indication subordinate to the second level field Successful RL Information Response, two fourth level fields, Combining and Non Combining, are provided, to which fifth level fields, RL ID and DCH Information Response are provided subordinate thereto respectively. The Combining field is used to inform the RNC of the softer combining, and the Non Combining field is used to inform the RNC of the new establishment/new addition of DCH.

The third level field E-DCH FDD Information Response, also subordinate to the second level field Successful RL Information Response, is used to inform the RNC 710 that a link on which E-DCH traffic runs needs to be established for the UE 740. In particular, if E-DCH traffic needs to be combined with another radio link, the field E-DCH FDD Information Response does not need to be filled. Conversely, if E-DCH traffic does not need to be combined with another radio link, the field E-DCH FDD Information Response needs to be filled.

In other words, the third level field CHOICE Diversity Indication and the third level field E-DCH FDD Information Response are generated subordinate to a same second level field of a RADIO LINK ADDITION FAILURE message according to the embodiment of the present invention. Therefore, combining/non-combining of DCH on radio links and new establishment/new addition of E-DCH are independent of each other. In this way, both the information of the softer combining and the information of the establishment of E-DCH traffic can be informed to the RNC 710, avoiding a communication fault due to the fact that only one of the information of the softer combining and the information of the establishment of E-DCH traffic can be selected because only one fourth level field can be selected in the third level field CHOICE Diversity Indication in the prior art no matter how the CHOICE Diversity Indication field is filled. As a result, normal and stable communication is ensured in the case of mobile handover of the UE 740 between cells of NODEBs 721 and 722.

The scenario to which the embodiments of the present invention can be applied is not limited to that described above. The present invention is applicable to any case in which softer combining needs to be implemented and establishment/addition of relevant traffic needs to be reported to the RNC, to avoid occurrence of the above problem. For example, the present invention is applicable to a case in which an addition of a plurality of radio links for bearing E-DCH traffic, including RL2, succeeds and an addition of RL3 for bearing any traffic fails. The present invention is also applicable to a case in which an addition of only one radio link RL2 for bearing E-DCH traffic succeeds and an addition/establishment of a plurality of links, RL3, RL4, RL5, and so on fails. In other words, the present invention is applicable to any case in which addition of at least one radio link for bearing E-DCH traffic succeeds and addition of at least one radio link fails, which needs to be reported to the RNC in a RADIO LINK ADDITION FAILURE message.

The format in which the information of the DCH softer combining and the information of the addition of E-DCH traffic are filled into different third level fields is not limited to that shown in Table 4. Alternatively, Combining in the third level field CHOICE Diversity Indication is used to indicate the information of the addition of E-DCH traffic, and the third level field E-DCH FDD Information Response not subordinate to the second level field Successful RL Information Response is used to indicate the information of the DCH softer combining. As a further alternative, Combining in the third level field CHOICE Diversity Indication is used to indicate the information of the DCH softer combining, and any fifth, fourth, third, second, or first level field external to the second level field Successful RL Information Response is used to indicate the information of E-DCH traffic. Moreover, the relative position relationship between the CHOICE Diversity Indication and E-DCH FDD Information Response fields may be arranged arbitrarily in the table.

Another embodiment of the method for mobile communication handover according to the present invention is similar to the above embodiment, and the difference lies in the way of informing the RNC of the information of the softer combining and information of the addition of E-DCH traffic in the case that the addition of a third link fails, which is shown in Table 5.

TABLE 5

Schematic structure 2 of modified RADIO LINK ADDITION FAILURE message

| IE/Group Name | Presence | Range | IE Type and Reference | Semantics Description | Criticality | Assigned Criticality |
|---|---|---|---|---|---|---|
| ... | ... | ... | ... | ... | ... | ... |
| CHOICE Cause Level | M | | | | YES | ignore |
| >General | | | | | — | |
| >>Cause | M | | 9.2.1.6 | | — | |
| >RL Specific | | | | | — | |
| >>Unsuccessful RL Information Response | | 1 ... <maxnoofRLs-1> | | | EACH | ignore |
| >>>RL ID | M | | 9.2.1.53 | | — | |
| >>>Cause | M | | 9.2.1.6 | | — | |
| >>Successful RL Information Response | | 0 ... <maxnoofRLs-2> | | | EACH | ignore |
| >>>RL ID | M | | 9.2.1.53 | | — | |
| >>>RL Set ID | M | | 9.2.2.39 | | — | |
| >>> Received Total Wide Band Power | M | | 9.2.2.39A | | — | |
| >>>CHOICE Diversity Indication | M | | | | — | |
| >>>>Combining | | | | | — | |
| >>>>>RL ID | M | | 9.2.1.53 | Reference RL | — | |
| >>>>>E-DCH FDD Information Response | O | | 9.2.2.13Db | | YES | ignore |
| >>>>Non Combining | | | | | — | |
| >>>>>DCH Information Response | M | | 9.2.1.20C | | — | |
| >>>>>E-DCH FDD Information Response | O | | 9.2.2.13Db | | YES | ignore |
| >>>SSDT Support Indicator | M | | 9.2.2.46 | | — | |
| ... | ... | ... | ... | ... | ... | ... |

This embodiment features in that both the information of the DCH softer combining and the information of the addition of E-DCH traffic are carried in the Combining field subordinate to the CHOICE Diversity Indication field in a RADIO LINK ADDITION FAILURE message and informed to the RNC. As shown in Table 5, the fifth level fields RL ID and E-DCH FDD Information Response are both subordinate to the fourth level field Combining so that both the information of the DCH softer combining and the information of the addition of E-DCH traffic can be informed to the RNC, avoiding occurrence of the problem that they can not be both informed to the RNC in the prior art and achieving the same technical effects as the previous embodiments.

Referring to FIG. 7, another embodiment of the present invention provides a mobile communication system including a UE 740, NODEB 721 and NODEB 722, and an RNC 710. The NODEB 722 includes a handover information generation unit 723. Mobile communication handover for the UE 740 is implemented between NODEB 721 and NODEB 722 which are under the control of the RNC 710. The NODEB 721 has CELL0 and the NODEB 322 has CELL1, CELL2 and CELL3. CELL0 and CELL2 support DCH and E-DCH traffic, CELL1 supports only DCH traffic, and there is no specific requirement for CELL3, i.e. CELL3 may support any traffic.

The NODEB 722 has a first link RL1 for bearing only DCH traffic. The UE 740 establishes RL1 with CELL1 of the NODEB 722 when both DCH and E-DCH traffic are implemented in CELL0 of the NODEB 721.

When the RNC 710 requests the NODEB 722 to add a second link RL2 for bearing DCH and E-DCH traffic, the NODEB 722 implements softer combining of DCH traffic on RL1 and RL2. The NODEB 722 informs the RNC 710 of information of the softer combining and information of the new addition of E-DCH traffic through the handover information generation unit 723. When the RNC 710 requests the NODEB 722 to add a third link RL3, the NODEB 722 informs the RNC 710 of information of the new addition of RL3 through the handover information generation unit 723.

In particular, the handover information generation unit 723 is adapted to generate a CHOICE Diversity Indication field, the content of which is Combining, and an E-DCH FDD Information Response field, both of which are a third level field, in a RADIO LINK ADDITION FAILURE message, and send the RADIO LINK ADDITION FAILURE message carrying the information of the DCH softer combining and the information of the new addition of E-DCH traffic to the RNC 710.

For the structure of the RADIO LINK ADDITION RESPONSE message, reference may be made to the above Table 4.

As can be seen, two different third level fields, i.e. the third level field CHOICE Diversity Indication and the third level field E-DCH FDD Information Response are generated in a same RADIO LINK ADDITION FAILURE message by the handover information generation unit 723 according to the embodiment of the present invention. Therefore, the information of the softer combining and the information of the addition of E-DCH traffic are informed to the RNC 710, avoiding a communication fault due to the fact that only one of the information of the softer combining and the information of the addition of E-DCH traffic can be selected because only one fourth level field can be selected in the third level field CHOICE Diversity Indication in the prior art no matter how the CHOICE Diversity Indication field is filled, and keeping RL2 successfully that can enable normal communication.

In another embodiment, the handover information generation unit 723 is adapted to generate a RADIO LINK ADDITION FAILURE message that contains a Combining field for informing the RNC. The Combining field is subordinate to a CHOICE Diversity Indication field and carries both the information of the DCH softer combining and the information of the addition of E-DCH traffic.

Accordingly, another embodiment of the present invention provides a mobile communication base station including:

a link management unit under the control of a radio network controller, adapted to manage a first link for bearing only DCH traffic and add a second link for bearing DCH and E-DCH traffic and a third link for bearing any traffic;

a softer combining unit, adapted to implement softer combining of DCH traffic on the first and second links in the case of failure to add the third link; and a handover information generation unit, adapted to inform the radio network controller of both information of the softer combining of DCH traffic and information of the addition of E-DCH traffic.

The information of the softer combining of DCH traffic and the information of the addition of E-DCH traffic may be informed to the radio network controller by being not carried in a same choice diversity indication field of a RADIO LINK ADDITION FAILURE message; or the information of the softer combining of DCH traffic and the information of the addition of E-DCH traffic may be informed to the radio network controller by being both carried in a combining field subordinate to a choice diversity indication field of a RADIO LINK ADDITION FAILURE message; or the information of the softer combining of DCH traffic and the information of the addition of E-DCH traffic may be informed to the radio network controller by being carried in different first level fields of a RADIO LINK ADDITION RESPONSE message.

In the case of being not informed to the radio network controller by a same choice diversity indication field of a RADIO LINK ADDITION FAILURE message, the information of the softer combining of DCH traffic is indicated by a third level field CHOICE Diversity Indication containing Combining and the information of the addition of E-DCH traffic is indicated by a third level field E-DCH FDD Information Response subordinate to a same second level field as the third level field CHOICE Diversity Indication.

A method for mobile communication handover and a system thereof according to the present invention have been described in detail above. Some examples have been taken to illustrate the principle and the embodiments thereof. However, the illustration of the embodiments is intended merely to provide understanding of the methods according to the present invention and the ideas thereof. According to such ideas, those skilled in the art can envisage different embodiments and applications of the present invention. Therefore, the above description should not be construed as a limitation to the scope of the present invention.

What is claimed is:

1. A method for mobile communication handover comprising the following steps:
   in addition to a first link for bearing only DCH traffic, adding a second link for bearing DCH and E-DCH traffic and a third link for bearing any traffic;
   in the case of failure to add the third link, implementing softer combining of DCH traffic on the first and second links; and
   informing a radio network controller of both information of the softer combining of DCH traffic and information of the addition of E-DCH traffic, according to which the radio network controller performs communication control.

2. The method for mobile communication handover according to claim 1 wherein the information of the softer combining of DCH traffic and the information of the addition of E-DCH traffic are informed to the radio network controller by being not carried in a same choice diversity indication field of a RADIO LINK ADDITION FAILURE message.

3. The method for mobile communication handover according to claim 2 wherein in the case of being not informed to the radio network controller by a same choice diversity indication field of a RADIO LINK ADDITION FAILURE message, the information of the softer combining of DCH traffic is indicated by a third level field CHOICE Diversity Indication containing Combining and the information of the addition of E-DCH traffic is indicated by a third level field E-DCH FDD Information Response subordinate to a same second level field as the third level field CHOICE Diversity Indication.

4. The method for mobile communication handover according to claim 1 wherein the information of the softer combining of DCH traffic and the information of the addition of E-DCH traffic are informed to the radio network controller by being both carried in a combining field subordinate to a choice diversity indication field of a RADIO LINK ADDITION FAILURE message.

5. The method for mobile communication handover according to claim 4 wherein the information of the softer combining of DCH traffic is carried in the fifth level field CHOICE Diversity Indication, and
   the information of the addition of E-DCH traffic is carried in the fifth level field E-DCH FDD Information Response, wherein,
   the fifth level fields RL ID and E-DCH FDD Information Response are both subordinate to the fourth level field Combining.

6. The method for mobile communication handover according to claim 2 wherein the information of the addition of E-DCH traffic is informed to the radio network controller in such a manner that the field E-DCH FDD Information Response is null if E-DCH traffic needs to be combined with another radio link, and is filled otherwise.

7. The method for mobile communication handover according to claim 3 wherein the information of the addition of E-DCH traffic is informed to the radio network controller in such a manner that the field E-DCH FDD Information Response is null if E-DCH traffic needs to be combined with another radio link, and is filled otherwise.

8. The method for mobile communication handover according to claim 4 wherein the information of the addition of E-DCH traffic is informed to the radio network controller in such a manner that the field E-DCH FDD Information Response is null if E-DCH traffic needs to be combined with another radio link, and is filled otherwise.

9. A mobile communication system comprising a first base station and a radio network controller, wherein
   the first base station has a first link subordinate thereto for bearing only DCH traffic, and is adapted to add a second link for bearing DCH and E-DCH traffic and a third link for bearing any traffic, implement softer combining of DCH traffic on the first and second links in the case of failure to add the third link, and inform the radio network controller of both information of the softer combining of DCH traffic and information of the addition of E-DCH traffic; and the radio network controller is adapted to perform communication control according to the received information.

10. The mobile communication system according to claim 9 wherein the information of the softer combining of DCH traffic and the information of the addition of E-DCH traffic are informed to the radio network controller by being not carried in a same choice diversity indication field of a RADIO LINK ADDITION FAILURE message.

11. The mobile communication system according to claim 10 wherein in the case of being not informed to the radio network controller by a same choice diversity indication field of a RADIO LINK ADDITION FAILURE message, the information of the softer combining of DCH traffic is indicated by a third level field CHOICE Diversity Indication containing Combining and the information of the addition of E-DCH traffic is indicated by a third level field E-DCH FDD Information Response subordinate to a same second level field as the third level field CHOICE Diversity Indication.

12. The mobile communication system according to claim 9 wherein the information of the softer combining of DCH traffic and the information of the addition of E-DCH traffic are informed to the radio network controller by being both carried in a combining field subordinate to a choice diversity indication field of a RADIO LINK ADDITION FAILURE MESSAGE.

13. A mobile communication base station comprising:
a link management unit under the control of a radio network controller, adapted to manage a first link for bearing only DCH traffic and add a second link for bearing DCH and E-DCH traffic and a third link for bearing any traffic;
a softer combining unit, adapted to implement softer combining of DCH traffic on the first and second links in the case of failure to add the third link; and
a handover information generation unit, adapted to inform the radio network controller of both information of the softer combining of DCH traffic and information of the addition of E-DCH traffic.

14. The base station according to claim 13 wherein
the information of the softer combining of DCH traffic and the information of the addition of E-DCH traffic are informed to the radio network controller by being not carried in a same choice diversity indication field of a RADIO LINK ADDITION FAILURE message; or
the information of the softer combining of DCH traffic and the information of the addition of E-DCH traffic are be informed to the radio network controller by being both carried in a combining field subordinate to a choice diversity indication field of a RADIO LINK ADDITION FAILURE message,
in the case of being not informed to the radio network controller by a same choice diversity indication field of a RADIO LINK ADDITION FAILURE message, the information of the softer combining of DCH traffic is indicated by a third level field CHOICE Diversity Indication containing Combining and the information of the addition of E-DCH traffic is indicated by a third level field E-DCH FDD Information Response subordinate to a same second level field as the third level field CHOICE Diversity Indication.

15. The base station according to claim 13 wherein the information of the softer combining of DCH traffic is carried in the fifth level field CHOICE Diversity Indication, and
the information of the addition of E-DCH traffic is carried in the fifth level field E-DCH FDD Information Response, wherein,
the fifth level fields RL ID and E-DCH FDD Information Response are both subordinate to the fourth level field Combining.

* * * * *